March 8, 1938.    E. O. SEAVER    2,110,740
FASTENING DEVICE
Original Filed Nov. 6, 1933
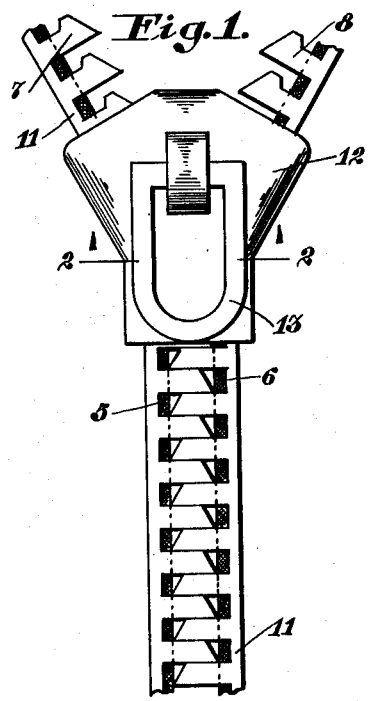
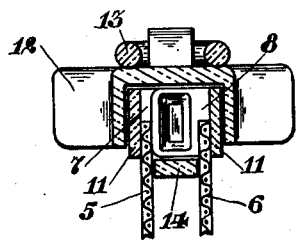
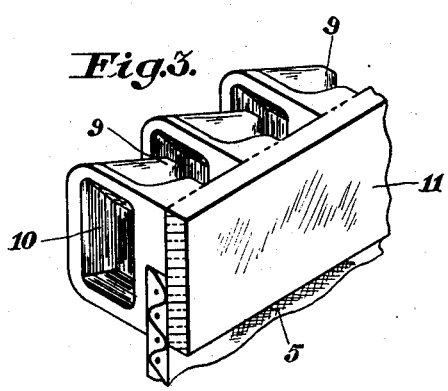
INVENTOR.
Elliot O. Seaver
BY Kelley & Chisholm
ATTORNEYS.

Patented Mar. 8, 1938

2,110,740

UNITED STATES PATENT OFFICE 2,110,740

FASTENING DEVICE

Elliot O. Seaver, Meadville, Pa., assignor to Talon, Inc., a corporation of Pennsylvania Application November 6, 1933, Serial No. 696,799
Renewed July 30, 1937

6 Claims. (Cl. 24—205)

My invention relates to fastening devices and particularly to an improved fastener having multiple elements interlocking in a continuous series, and especially adapted for use on pockets, all kinds of bags, pouches, and the like.

The fastener elements are formed with projections and recesses having any known shape so as to interlock when engaged with similar elements. Such elements are secured to the inner faces and along the edges of the bag or pocket, and the interlocking ends of the elements extend toward the opposing side of the bag or pocket. A semi-rigid strip joins the fastener elements of each row and also serves to help hold them on the edge of the bag or other article.

In the accompanying drawing, I have shown for purposes of illustration, one embodiment which my invention may assume in practice. In the drawing:

Fig. 1 is a plan view of my improved form of fastener;

Fig. 2 is a cross section on line 2—2 of Fig. 1; and

Fig. 3 is a detail view of a small portion of the fastener.

Reference is made to "mounting members" which will be understood to mean flexible members such as tapes for securing the fastener in an article, or the edges of the article itself. However, one of the advantages of my invention is that the fastener can be applied easily to the article to be fastened without the use of such fabric tape, if the tape is objectionable for any reason.

The mounting members are indicated in the drawing by the numerals 5, 6 and the fastener elements 7, 8 are attached to the mounting members along their edges. These fastener elements are preferably made of non-metallic material such as a soluble plastic and it has been found that pyroxylin is well adapted for the purpose since it can be formed readily to the proper shape, and can be provided in any desired color at reasonable cost. Preferably the fastener elements are stuck to the adjacent or inner surfaces of the mounting members. The term "stuck" is used herein and in the appended claims in the same sense as it is used in the patent to Corner No. 1,920,138. It is a structural term indicating that the parts are held or secured together by cement, glue, or the like, or by the adhesive effect produced by bringing the two parts to be joined into contact with each other with or without pressure while the non-metallic material is in a softened state. This softening may be produced by heat, solvents, or other means. The term distinguishes from constructions in which the parts are held together by mechanical holding means such as screws, bolts, mechanical joints, solder, and the like. The fastener elements extend sidewise toward the opposite mounting member. The interlocking projections 9 and recesses 10 cooperate in a well-known manner with similar projections and recesses of the fastener elements in the opposite series.

The attached ends of the fastener elements are joined together by a semi-rigid strip 11, extending continuously from one end to the other of the fastener. This strip is preferably of the same material as the interlocking members and is stuck to them. A semi-rigid strip is one which has sufficient flexibility to permit the necessary flexing or bending of the rows of interlocking elements to permit their being interlocked and disengaged and yet which has sufficient rigidity to retain its shape without being supported, as distinguished from fabric which is not sufficiently rigid to be self-supporting. For example, one way of securing such a semi-rigid strip is to form it as shown in Fig. 3 of material such as pyroxylin. The strip is relatively wide and is substantially rigid in the direction of its width while it is relatively thin and sufficiently flexible in the direction of its thickness. The opening and closing of the fastener can be accomplished by hand or by the use of a slider 12 which can be operated by a pull tab 13. The slider has an outer housing portion covering the continuous surfaces of the strips 11 and a lower wing portion 14 sliding between the mounting members and supporting ends of the fastener elements.

If desired, the fastener may be supplied without the usual fabric tapes. In this case, the semi-rigid strips 11 will hold the fastener elements in the proper relative position during the attachment of the fastener in an article.

While I have shown and described in this application one embodiment which my invention may assume in practice, it will be understood that this embodiment is merely for the purposes of illustration and description and that various other forms may be devised within the scope of my invention as defined in the appended claims.

What I claim as my invention is:

1. A fastening device for closing the mouth of a bag or the like comprising parallel mounting members, cooperating rows of fastener elements attached to said mounting members and having interlocking portions projecting from the inner face of each mounting member toward the inner face of the opposite mounting member, and a semi-rigid continuous strip joining said fastener elements and attached to the outer face of each mounting member.

2. A fastening device of the class described comprising parallel mounting members, cooperating rows of fastener elements attached to said mounting members having interlocking portions projecting from the inner face of each mounting member toward the inner face of the opposite member, and continuous strips made of the same material as said fastener elements joining said fastener elements and forming continuous bearing surfaces for a slider, and a slider movable along said surfaces for engaging and disengaging said fastener elements.

3. A fastening device of the class described comprising flexible parallel mounting members, fastener elements made of non-metallic material and having interlocking portions arranged between said mounting members, said fastener elements stuck to the adjacent parallel surfaces of said mounting members, and continuous non-metallic strips stuck to said mounting members, and to the outer surfaces of each fastener element.

4. A fastening device of the class described comprising a pair of fabric mounting members arranged in parallel relation, and fastener elements of soluble plastic material stuck to the inner faces of said fabric mounting members, and strips of soluble plastic material united to said fastener elements and stuck to the outer surfaces of said mounting members.

5. A fastening device of the class described comprising cooperating rows of fastener elements arranged in staggered relation, each having a projection and recess at its interlocking end adapted to engage in recesses and projections respectively of the opposite series, and backing strips of hard material joining the ends of the fastener elements opposite their interlocking ends, said strips being flexible in the longitudinal plane and substantially rigid in the transverse plane.

6. A fastening device as defined in the preceding claim and a slider mounted on said rows of fastener elements and sliding on said backing strips for engaging and disengaging the fastener elements.

ELLIOT O. SEAVER.